United States Patent [19]
Flynn

[11] Patent Number: 5,463,263
[45] Date of Patent: Oct. 31, 1995

[54] PERMANENT MAGNET CONTROL MEANS

[75] Inventor: Charles J. Flynn, Kansas City, Mo.

[73] Assignee: Magnetic Revolutions Limited L.L.I., St. Louis, Mo.

[21] Appl. No.: 104,783

[22] Filed: Aug. 11, 1993

Related U.S. Application Data

[62] Division of Ser. No. 828,703, Jan. 31, 1992, Pat. No. 5,254,925.

[51] Int. Cl.$^6$ .................. H02K 23/04; H02K 29/10; H02K 11/00; H02K 1/27
[52] U.S. Cl. .................. 310/181; 310/156; 310/68 B
[58] Field of Search .................. 310/46, 68 B, 310/20, 24, 152, 156, 181, 268; 335/229, 230, 231, 232, 233, 234, 272; 318/135

[56] References Cited

U.S. PATENT DOCUMENTS

| | | | |
|---|---|---|---|
| 2,669,687 | 2/1954 | Tastes | 310/46 |
| 3,089,064 | 5/1963 | Cotton de Bennetot | 335/230 |
| 3,488,534 | 1/1970 | Baermann | 310/93 |
| 3,566,251 | 2/1971 | Hoglund | 310/181 |
| 3,569,806 | 3/1971 | Brailsford | 318/254 |
| 3,670,189 | 6/1972 | Monroe | 310/181 |
| 3,922,590 | 11/1975 | Warren et al. | 310/156 |
| 3,939,367 | 2/1976 | Ramirez | 310/20 |
| 4,007,387 | 2/1977 | Rustecki | 310/181 |
| 4,015,174 | 3/1977 | Cotton de Bennetot | 335/234 |
| 4,456,858 | 6/1984 | Loven | 310/156 |
| 4,496,887 | 1/1985 | Ichihara et al. | 310/156 |
| 4,523,114 | 6/1985 | Smith | 310/24 |
| 4,528,533 | 7/1985 | Montagu | 310/49 R |
| 4,556,858 | 12/1985 | Koehler | 335/234 |
| 4,638,192 | 1/1987 | von der Heide | 310/12 |
| 4,639,626 | 1/1987 | McGee | 310/268 |
| 4,972,112 | 11/1990 | Kim | 310/181 |

FOREIGN PATENT DOCUMENTS

| | | | |
|---|---|---|---|
| 319905 | 4/1920 | Germany | 310/46 |
| 712730 | 11/1941 | Germany | 335/272 |
| 2336703 | 2/1975 | Germany | 310/46 |
| 1151901 | 5/1969 | United Kingdom | 335/272 |
| WO91/04603 | 4/1991 | WIPO | 310/156 |

OTHER PUBLICATIONS

Laithwaite et al., Linear-Motion Electrical Machines, Apr. 1970, pp. 531–542.

Primary Examiner—Clayton E. LaBalle
Attorney, Agent, or Firm—Haverstock, Garrett and Roberts

[57] ABSTRACT

A motion producing device using permanent magnets as the source of energy including one or more permanent magnets at least one having a coil mounted on it, and an electric circuit for connecting the coil to a source of electric energy whereby application of the energy to the coil changes or modifies the magnetic characteristics of the permanent magnet on which it is mounted in such a manner that when another permanent magnet is in the field of the controlled permanent magnet, the interaction between the permanent magnets will be modified so as to change the coupling force therebetween. The present device can be used to produce rotational motion, linear motion, oscillating motion, and combinations of these.

14 Claims, 8 Drawing Sheets

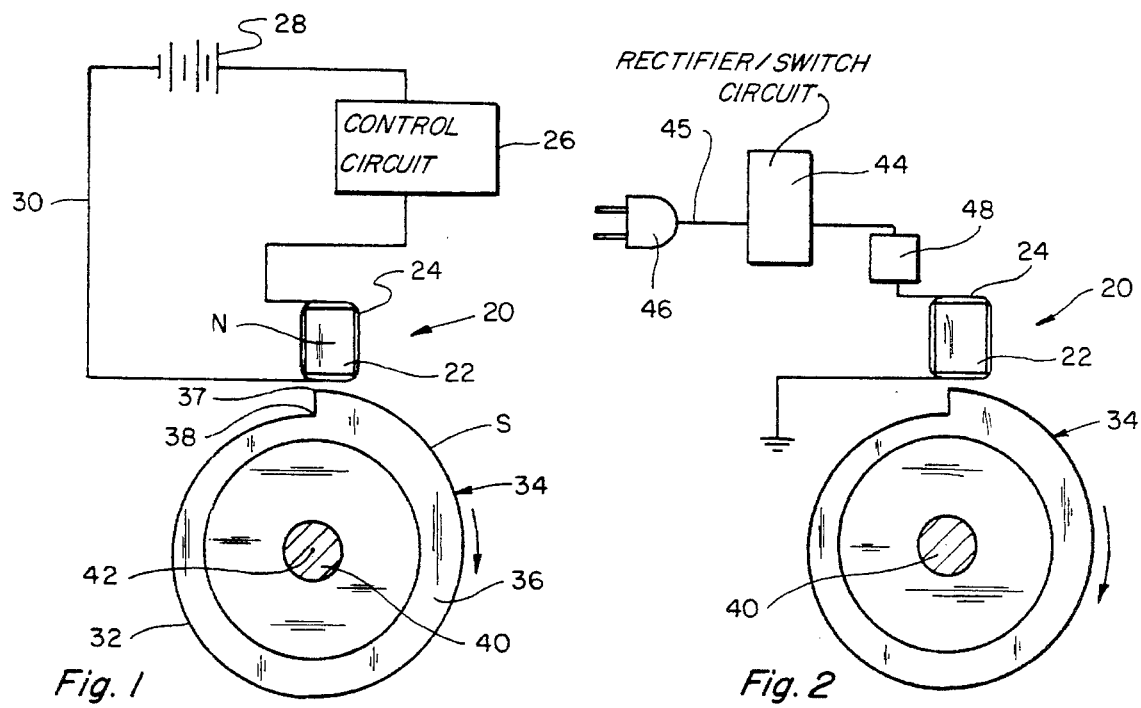
Fig. 1
Fig. 2
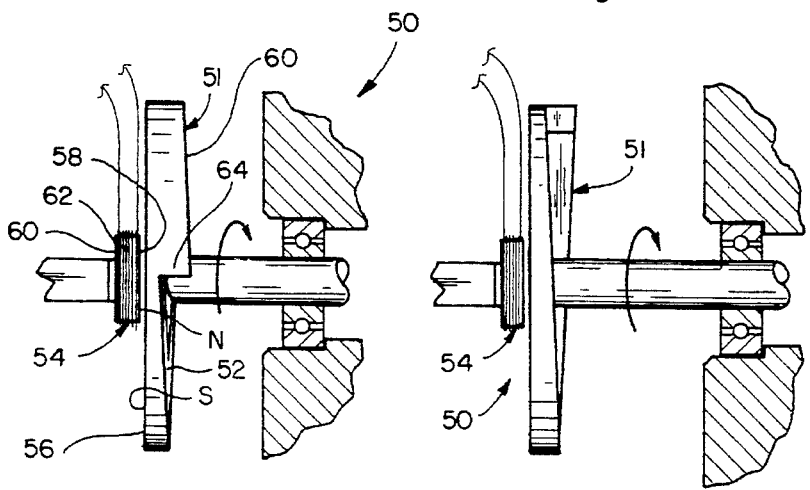
Fig. 3
Fig. 4
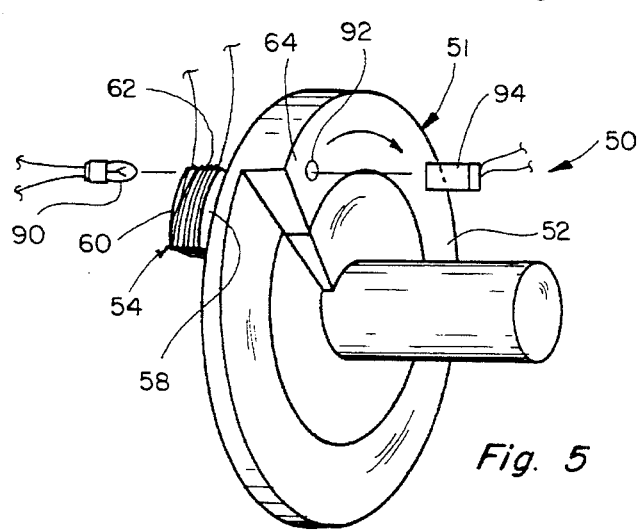
Fig. 5

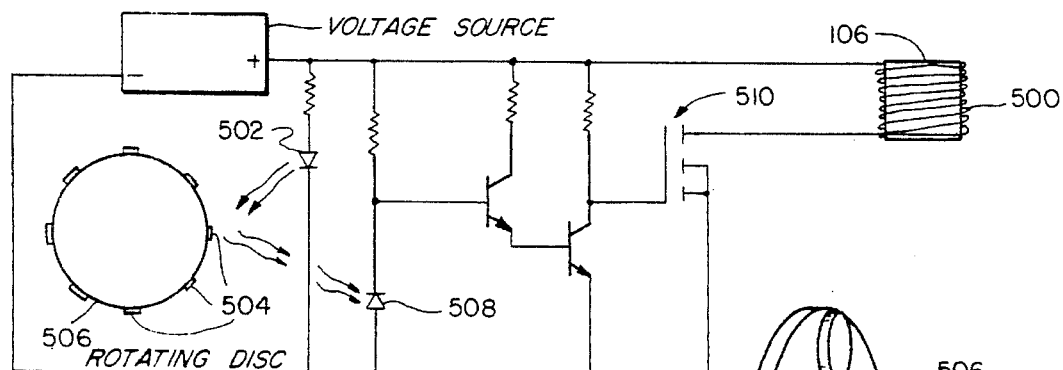
Fig. 22
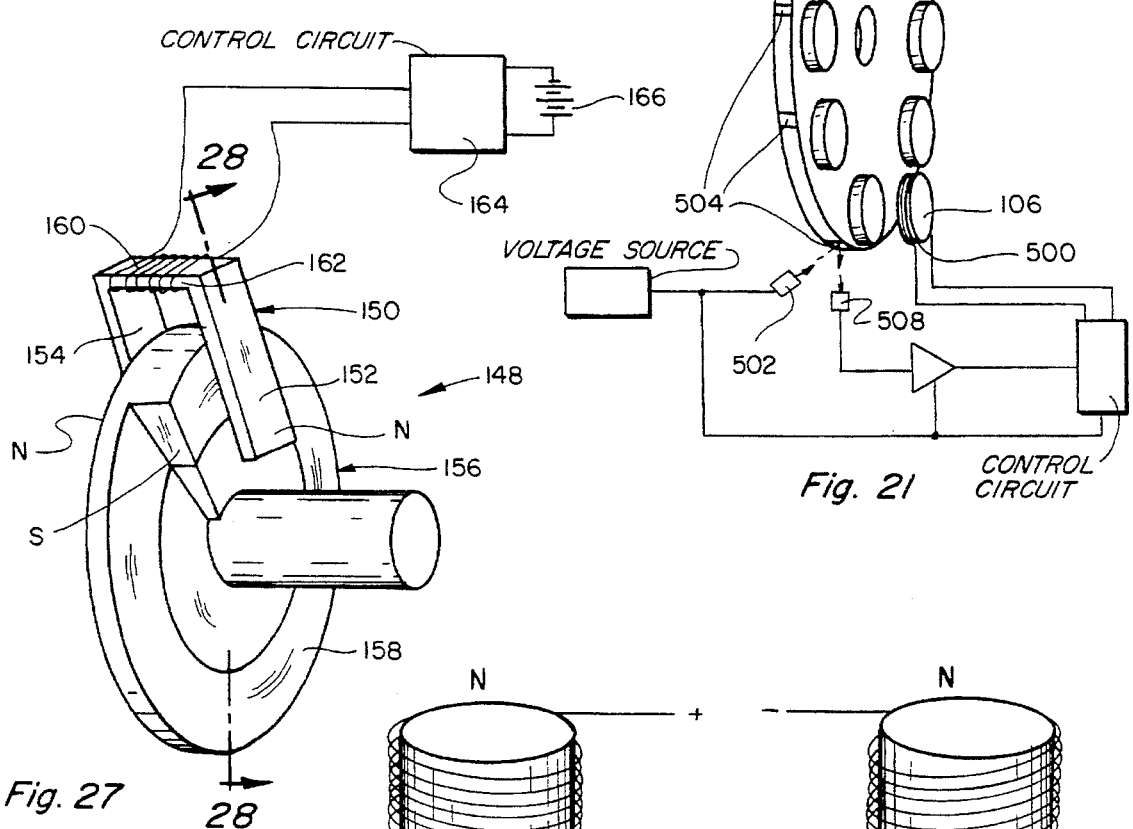
Fig. 27
Fig. 21
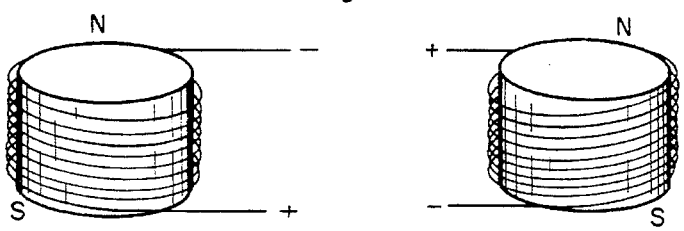
Fig. 23
Fig. 24
Fig. 25
Fig. 26

PERMANENT MAGNET CONTROL MEANS

This is a divisional of copending application Ser. No. 07/828,703, filed on Jan. 31, 1993, now U.S. Pat. No. 5,254,925.

BACKGROUND OF THE INVENTION

The present invention relates to novel means for producing rotary and other types of motion using a controllable permanent magnet. The closest known prior art to the present construction is disclosed in Applicants' co-pending U.S. patent application Ser. No. 322,121, filed Mar. 13, 1988, and entitled MEANS FOR PRODUCING ROTARY MOTION. The prior art listed in the file of application Ser. No. 322,121, is also incorporated herein by reference.

DESCRIPTION OF THE INVENTION

There are many devices that require a rotating member for some purpose. For the most part the known devices have included electric motors of various types, certain types of mechanically driven rotating members, and there are some devices that use permanent magnets which produce limited amounts of rotating motion. The present invention resides in means capable of producing continuous rotating motion using one or more controllable permanent magnets positioned adjacent to and magnetically coupled to a portion of a rotating member having predetermined magnetic properties that vary in a particular way around the circumference thereof. In a like manner the controllable permanent magnets are mounted on a non-magnetic rotatable member positioned adjacent to and magnetically coupled to a portion of a stationary member having predetermined magnetic properties that vary in a particular way around the circumference thereof. The subject magnetic means are able to produce continuous rotary motion of the rotating member if the magnetic coupling between the field of the permanent magnet is interrupted at a predetermined position during each cycle of rotation of the rotating member.

The present invention also teaches controlling the field of a permanent magnet and the use of such a device to produce rotational or other motion. One embodiment of the present invention includes a disc or disc-like members journaled for rotation about the axis thereof. The disc is constructed to have a band of magnetic or magnetizable material extending around the periphery thereof, and the band is such that its magnetic properties vary, from a minimum to a maximum condition adjacent to the same location or locations about the circumference. The device also includes a controllable permanent magnet mounted adjacent to the band of magnetic material on the rotating disc and magnetically coupled thereto such that the magnetic coupling force therebetween varies in a direction to continuously increase (or possible continously decrease in the repelling direction) and to thereby cause the disc to rotate. An electric winding is mounted on the permanent magnet and extends therearound between the opposite poles thereof. The winding is connected across a source of DC potential through controllable switch means. When the switch means are closed DC potential is applied to the coil to interrupt the magnetic field thereof and these interruptions are timed to occur at predetermined positions during rotation of the disc, namely at times when the maximum and minimum magnetic portions of the band of magnetic material on the rotating disc are moving adjacent to the permanent magnet. By so doing the field strength of the permanent magnet and hence its coupling to the disc, is substantially reduced or eliminated altogether and this occurs precisely when there otherwise would be maximum coupling therebetween in a direction to retard rotation. This means that the effect of the permanent magnet on the rotating disc is maintained in force during most of the rotation of the rotating disc to cause the rotation of the disc to occur but is effectively decoupled from the rotating disc during those times when maximum magnetic coupling would otherwise occur. This is done to prevent the rotating disc from being stopped by the force of the magnetic coupling.

The present invention also relates to the means for controlling and particularly interrupting the magnetic characteristics of a permanent magnet as well as means to make use of this control to produce rotary motion. There are in existence various devices that produce rotation due to the action or coupling between magnetic members. However so far as known, except for applicants copending application Ser. No. 322,121, there are no devices capable of producing continuous rotating motion of a rotating member where the force to do so is produced by magnetically coupling a permanent magnet to a portion of the rotating member and wherein the device includes means for predeterminately controlling or temporarily interrupting the field of the permanent magnet in the manner taught by the present invention. The present invention therefore resides in the use of a controllable permanent magnet having a north and a south pole and a winding mounted on or wound around the permanent magnet in the region between the poles, and the invention resides in mounting such a permanent magnet adjacent to the magnetic portion of the rotatable member. The device also includes a switch type circuit connected across the winding and controllable as by electronic switch means sychronized to the position of the rotary member such that when the switch means are in their open condition the field of the permanent magnet will be relatively uneffected and will be magnetically coupled to the rotating member but when the switch means are closed, the field of the permanent will be substantially modified and effectively eliminated so that no magnetic coupling will occur. The timing of the elimination of the field of the permanent magnet is important to the present invention. The physical shape and orientation of the magnetic poles of the magnetic portion of the rotating member are also important to the invention and several of many possible embodiments thereof are disclosed herein. The shape of the magnetic or magnetizable portion of the rotating member is also important and should be such that the magnetic coupling force changes (increases or decreases) continuously as the disc rotates.

OBJECTS OF THE INVENTION

It is a principal object of the present invention to use the energy of a permanent magnet to produce rotational or some other movement of a member.

Another principal object is to provide means to predeterminately temporarily modify or eliminate or isolate the magnetic field produced by a permanent magnet.

Another object is to use a permanent magnet having a controllable magnetic field to produce rotating or other motion of a member having a portion constructed of magnetic material.

Another object is to reduce the amount of energy required to produce rotational or other motion.

Another object is to control the magnetic coupling between a permanent magnet and a magnetic portion of a rotating member in a way so as to produce continuous rotation of the rotating member.

Another object is to modify or eliminate or isolate the field produced by a permanent magnet by the application of a DC field to a coil wound around the permanent magnet.

Another object is to provide a means, where the amount of energy that would be produced in the form of back EMF in a conventional wire wound iron rotor/stator, is returned to the system directly as magnetic energy.

Another object is to provide relatively inexpensive means for producing rotational motion of a rotatable member.

Another object is to provide means where all output torque is produced solely from the interactation of permanent magnets.

Another object is to produce continuous motion without the production of eddy current losses which is not possible with any known electro-magnetic system prior to the present invention.

Another object is to predeterminately time the interruptions of the magnetic field of a permanent magnet used to produce rotational movement of a rotatable member.

Another object is to use the magnetic force of a permanent magnet to produce rotational, oscillatory, linear and/or reciprocating motion.

Another object is to produce rotational speed and output torque that are not related to input power.

These and other objects and advantages of the present invention will become apparent after considering the following detailed specification in conjunction with the accompanying drawings.

BRIEF DESCRIPTION OF THE DRAWINGS

FIG. 1 is a diagramatic view showing a battery operated embodiment of a device capable of producing rotational motion of a rotatable member;

FIG. 2 is a view of a device similar to the device of FIG. 1 but showing the device using a rectified alternating current energy source;

FIGS. 3 and 4 are side elevational views of another embodiment of the subject device;

FIG. 5 is a perspective view of the embodiment of the device shown in FIGS. 3–4;

FIG. 21 is a perspective view showing another embodiment of a rotating disc with permanent magnets mounted thereon and with a stationary permanent magnet with a coil mounted on it and with optically controlled circuit means connected thereto;

FIG. 22 is a schematic circuit diagram of the control circuit for the construction shown in FIG. 21;

FIG. 23 is a perspective view of a permanent magnet with a coil wound thereon in a counterclockwise direction as viewed from the north pole of the permanent magnet;

FIG. 24 is a permanent magnet with a coil wound thereon similar to that shown in FIG. 23 except that the coil is wound clockwise when viewed from the north pole;

FIG. 25 is a view similar to FIG. 23 except that the coil is wound counterclockwise with the south pole of the coil located adjacent to the north pole of the permanent magnet;

FIG. 26 is a view similar to FIG. 25 except that the coil is wound clockwise when viewed from the north pole of the permanent magnet;

FIG. 27 is a perspective view of another embodiment of the invention;

DETAILED DESCRIPTION OF THE INVENTION

Figure 6:
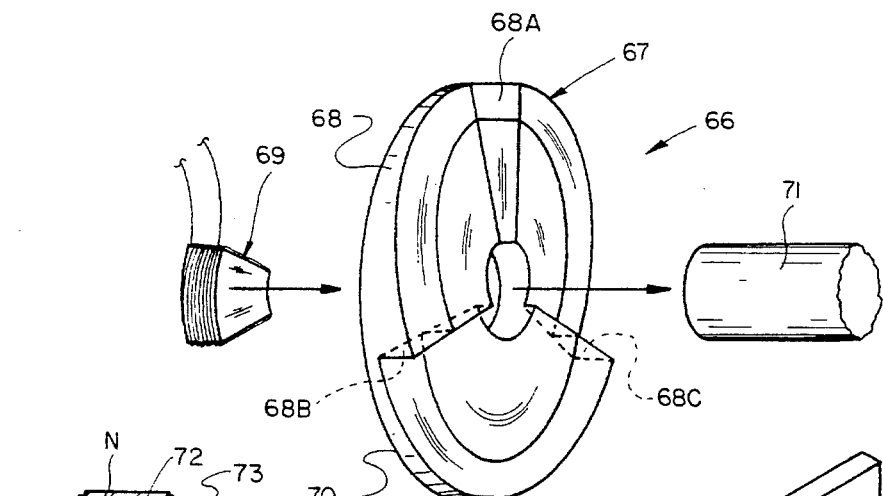
FIG. 6 is a perspective view showing another embodiment of the present device.

Referring to the drawings more particularly by reference numbers, number twenty 20 in FIG. 1 refers to a magnet assembly including a permanent magnet 22 shown having a north (N) pole which is visible and a south (S) pole at its opposite end which ends are oriented as shown. The permanent magnet 22 also has a winding 24 wound around it in the area between the north and south poles. The winding 24 is connected into a series circuit which includes a control circuit 26 that includes switch means in series with a DC source shown as battery 28. The grounded or negative side of the battery 28 is connected by lead 30 to the other side of winding 24. The magnet assembly 20 is positioned adjacent to the peripheral edge 32 of a rotating disc member 34 which has a spiral shaped peripheral edge portion 36 formed of a magnetized or magnetizable material shown as having a south (S) pole aligned with the north (N) pole and a north (N) pole aligned with the south (S) pole of the magnet 22. This will produce magnetic attraction between the members 22 and 34 and clockwise rotation of the disc 34. If the magnetic poles of one of the members 22 and 36 is reversed, repelling force will be produced and the member 34 will rotate in a counterclockwise direction. Either case will work with the present invention. In the embodiment shown, the assembly 20 is magnetically coupled with or attracted to the magnetic edge portion 36 of the disc 34. In the construction shown in FIG. 1 the edge portion 36 extends from a radially outermost location 37 to an innermost location 38, both locations being located circumferentially at the same location. The disc 34 is mounted for rotation on shaft 40 which has an axis of rotation 42, and the shaft 40 is supported by suitable journal or bearing means, not shown.

The peripheral portion 36 of the disc 34 is shown being formed of magnetized material and is oriented as stated so that its south pole is closely adjacent to the north pole of the permanent magnet 22, and its north pole is on the side adjacent to the south pole of the magnet 22. This orientation produces maximum magnetic attraction or magnetic coupling between the members. The reasons for this will become apparent.

With the construction shown in FIG. 1, as the disc member 34 rotates, except for when the high spot 37 is adjacent to the permanent magnet 22, the edge portion 36 will move progressivelly closer to the magnet assemblies 20 increasing the magnetic coupling between the magnet assembly 20 and the peripheral portion 36 of the disc member 34. This increasing coupling is the force that produces the rotating movement of the disc 34. However, when the disc 34 rotates to the position as shown in FIG. 1, the coupling between the assembly 20 and the disc 34 reaches a maximum, and if nothing is done to reduce or eliminate the magnetic coupling at this place the disc will not continue to rotate but will stop. In order to reduce or eliminate the magnetic coupling force between the assembly 20 and the disc 34 at this point it is necessary to apply a DC potential across the winding 24. This is done for a long enough time for the high spot 37 to move past the magnet 22 as will be explained so that little or no retarding magnetic coupling will occur. The application of DC to the coil 24 will temporarily (as opposed to permanently) alter or eliminate or isolate during its application the magnet field of the permanent magnet 22 from the disc 34, and there will be little or no coupling therebetween. This condition will persist for as long as the DC is applied. Eliminating or isolating the magnetic field of the permanent magnet assembly 20 at and adjacent to movements of high spot 37 of the disc 34 past the assembly 20 means that the disc 34 will be able to continue to rotate indefinitely. Elimination of the magnetic field during this portion of each rotation of the disc 34 is under control of the control circuit 26 and the associated switch means which will be described later.

FIG. 2 shows a device that is similar to the device of FIG. 1 except that in the FIG. 2 construction the DC source is derived using a rectified AC source that includes a rectifier/switch circuit 44 which has a connection by cord 45 to a wall plug 46 or any other means of producing AC such as to an alternator and another connection to a switch control circuit 48 and from there to one side of the coil 24. The advantage of using the circuit of FIG. 2 over that of FIG. 1 is that the DC source is not dependant on a battery for controlling the switch means.

FIGS. 3–5 show another embodiment 50 of the subject construction wherein disc member 51 has a variable thickness magnetized or magnetic peripheral portion 52 which extends around the circumference thereof. In this construction controlled permanent magnet assembly 54 is mounted adjacent to flat side 56 of the magnetic disc portion 52 and has one of its poles, shown as north (N) pole 58, positioned closely adjacent to the flat south pole side 56 of the rotating member 51. In this construction the distance between the flat side 56 of the disc 51 and the magnet 54 remains constant but the magnetic coupling between the members varies with the thickness of the magnetic portion 52 of the disc 51. The opposite or south pole side 60 of the permanent magnet 54 and the north pole side of magnetic portion 52 of the disc 51 are spaced from each other on opposite sides of the respective members. The magnet assembly 54 has a winding 62 mounted thereon as shown and is connected to a circuit which may be similar to the circuits shown in FIGS. 1 and 2 to provide DC potential across the winding 62 whenever the permanent magnet assembly 54 is adjacent to, in this case, the thickest portion 64 of the rotating magnetic disc portion 52.

FIG. 4 is another view of the same construction 50 shown in FIG. 3 showing the permanent magnetic assembly 54 positioned adjacent to a different location of the magnetic peripheral portion 52 of the disc member 51, and FIG. 5 is a perspective view of the same construction 50 with an arrow to indicate the direction of rotation of the rotatable disc member 51. The direction of rotation would be in the opposite direction if the polarity of either magnet 52 or 54 were reversed.

FIG. 6 is an exploded view showing another embodiment 66 of the device which includes stepped rotating disc member 67. In this case the disc 67 has an annular magnetic or magnetizable portion 68 shown divided into three equal length helical segments or steps each of which has a thickest and a thinnest portion adjacent to respective transverse faces 68A, 68B and 68C. One or more spaced permanent magnet assemblies such as permanent magnet assembly 69 is located adjacent to the flat side 70 of the disc 67. Circuit means such as those described above with FIGS. 1 and 2 are provided to interrupt the magnetic field of the respective permanent magnets as they move adjacent to the thickest disc portions in the manner already described. In the construction shown in FIG. 6, the same or separate circuits can be provided to apply DC voltage to the coils wound on the various permanent magnet assemblies 69. The device 66 includes a shaft 71 and suitable journal or bearings means (not shown) to support the disc 67 for rotation.

Figure 8:
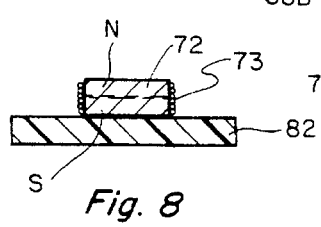
FIG. 8 is an enlarged cross sectional view taken on lines 8—8 of FIG. 7.
Figure 7:
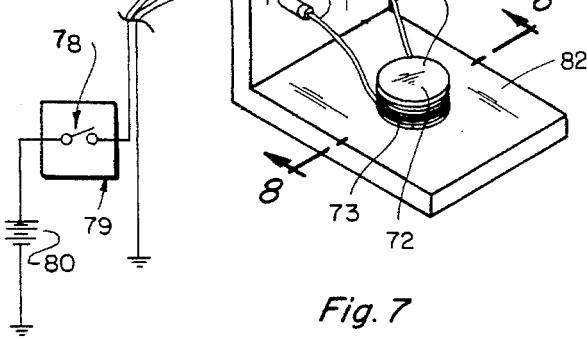
FIG. 7 is a perspective view of a controllable magnetic device constructed to illustrate certain teachings of the present invention.

FIGS. 7–12 are included to illustrate the effect of applying a DC potential across a winding mounted on or wound around a permanent magnet. In the construction as shown in FIGS. 7 and 8, permanent magnet 72, in the area between its north and south poles, has a winding 73 mounted thereon. Leads 74 and 76 are connected to opposite ends of the winding 73 and are also connected to a circuit such as shown in FIGS. 1 and 2 which includes a switch 78 in a timer or like control circuit 79 in series with battery 80 or other DC source. The magnet 72 is shown positioned on or attached to a non-conductive, non-magnetic platform or support member 82, see FIGS. 7 and 8.

Figure 9:
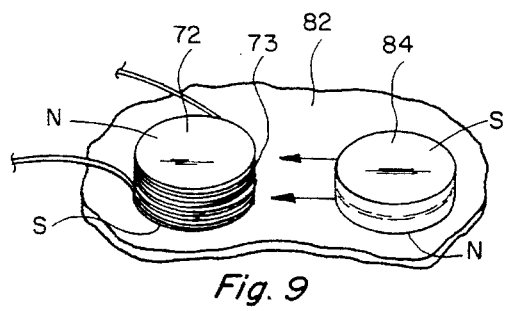
FIG. 9 is a fragmentary view of the device shown in FIGS. 7 and 8 showing the device coupled magnetically to another permanent magnet positioned adjacent thereto, the device being shown with no DC voltage applied to the coil wound around one of the permanent magnets.

In FIG. 9 a second magnet member 84 is shown positioned on the platform 82 in spaced relationship to the magnet 72 and arranged thereon to have its south pole in the plane of the north pole of the magnet 72 and its north pole in the plane of the south pole of the magnet 72. When no DC potential is applied to the coil 73, the magnet 84 will be attracted to and therefore will move toward the magnet 72 as indicated by the arrows and will remain against the magnet 72 unless forceably restrained or pulled away.

Figure 10:
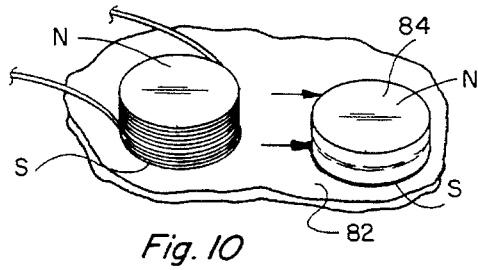
FIG. 10 is a perspective view similar to FIG. 9 showing the other associated permanent magnet in an overturned position relative to the controllable permanent magnet and with no DC voltage applied to the coil.

In FIG. 10 the same second magnet 84 is shown overturned on the platform 82 so that its north pole is in the plane of the north pole of the magnet 72 and its south pole is in the plane of the south pole of the magnet 72. In this situation the magnet 84 will be repelled by the magnet 72 and will therefore move away from it as indicated by the arrows.

Figure 11:
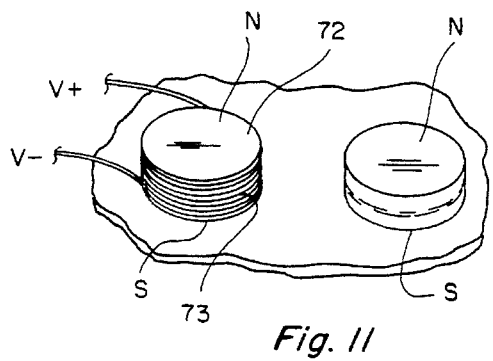
FIGS. 11 and 12 are perspective views similar to FIGS. 9 and 10 showing the absence of any magnetic force between the two permanent magnets which are shown in different relative positions when the controllable permanent magnet has a DC voltage applied across the winding wound therearound.
Figure 12:
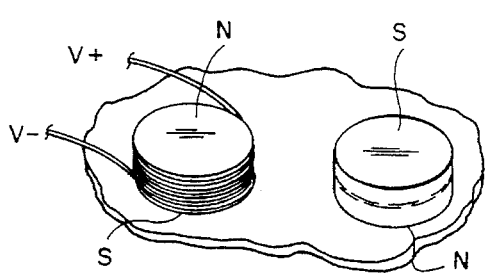

Referring to FIGS. 11 and 12, the same structure is shown as in FIGS. 7–10 except that a DC potential is applied across the coil 73 in a direction to oppose and cancel the field of the permanent magnet 72. Under these circumstances the magnetic field of the member 72 and its coupling to the magnet 84 is effectively eliminated or isolated so that the magnet 84 will neither be attracted to nor repelled by the magnet 72. This is true regardless of whether the magnet 84 has its north pole up or down. Furthermore, the fact the magnet 84 has no winding on it will not enable its own magnetic force to be able to magnetically couple to the magnet 72. FIGS. 7–12 illustrate some of the principles that are made use of in connection with the present invention, and are used to controllably couple or decouple the permanent magnet such as magnets 22, 54 and 69 to the magnetic or magnetizable portions 36, 52 or 68 of the rotatable member such as of the disc members 51 and 67.

Various means can be used to control the closing of the switch means associated with the control circuit 26, 48 and 79 to eliminate or prevent coupling between the magnet assembly 20, 54 or 69 and the respective rotating disc 34, 51 or 67. Keep in mind, however, that the rotation of the disc member in all cases is produced by the increasing of the magnetic coupling force when attracting or decreasing the coupling when repelling between the permanent magnet and the magnetic portion of the disc during most of each cycle of disc rotation. The control of the switch means can take place by timing means controlled by rotation of the disc such as by light from an electric light 90 shining through an opening such as opening 92 in the disc 51, FIG. 5, to a sensor 94 or by various other means as will be described.

It is important to an understanding of the invention that the principles of applying DC to a coil wound or mounted on a permanent magnet, be it the stationary or rotating magnet, affects the field, only of that magnet and only for as long as the DC is applied, but does not generally permanently alter or affect the magnetism of the permanent magnet especially if the permanent magnet is a ceramic or like type magnet.

Referring again to the construction shown in FIGS. 7–12, the question arises as to what happens to the magnetic field of a permanent magnet when the coil that encircles it is energized. If the coil is energized in a manner such that the magnetic field of the coil opposes the field of the permanent magnet on which it is mounted, then the north pole of the permanent magnet will short to the south pole of the coil and the south pole of the permanent magnet short to the north pole of the coil. In other words the coil will produce a counter magnetomotive force that opposes, and therefore cancels all or a predetermined portion of the magnetic force surrounding the permanent magnet. If the opposing magnetic field of the coil equals or nearly equals the field surrounding the permanent magnet, the effect is to neutralize or make the effective field of the permanent magnet equal to zero. If it has been reduced to zero in the manner indicted then even if another permanent magnet if brought into close proximity to that magnet it will not be attracted to or be magnetically coupled to the permanent magnet whose field has been cancelled and in effect the magnets will be isolated from each other. This happens in much the same way as putting an iron keeper on a horseshoe magnet. Cancelling the field of a permanent magnet has the further effect of blocking outside magnetic fields from reaching or coupling to the permanent magnet whose fields has been cancelled in this way. Therefore, not only does the coil cancel the effect of the permanent magnet but it also blocks or prevents other magnets including other permanent magnets brought into the vicinity thereof from having their fields reach the field of the magnet whose field has been cancelled. In other words the magnet whose field is cancelled is magnetically isolated from other magnets. It is this phenomenon of the present invention that enables interrupting the coupling between the magnets including between a stationary magnet and a rotating magnet, and this condition exists even when relatively large and powerful magnets are used. This also enables a relatively small device to be able to produce substantial rotational force and torque.

If the coil on the permanent magnet is oriented so that when energized the field of the coil is in aiding relation to the field of the permanent magnet, the resultant magnetic force will be increased to at or near the combined fields of the permanent magnet plus the field due to the energized coil. Under these circumstances the permanent magnet will attract (or repel) a second permanent magnet brought into the field thereof such as a rotating magnetic member, and will produce even greater coupling force between the members and at even greater distances between the magnets. This fact can be made use of in the present device to increase the torque generated in some embodiments.

It has been discovered that by energizing the coil on the permanent magnet for a relatively large portion of each cycle of rotation of the rotating magnetic member, except during the area of greatest attraction, as when the two members are closest together, will cause the rotating member to rotate at even greater speeds, even at several thousand RPM and at substantial torque. If, under these circumstances the magnetic field of the permanent magnet is interrupted during those portions of the rotational movement when there is the greatest attraction between the members, and during the remainder of the rotation the two magnets are fully magnetically coupled as aforesaid, then at no time will the rotation be interrupted. In this as in other embodiments the total rotational force is produced by the coupled magnets. With this construction the pole magnet will have a continuous magnetic field which will be increased during most of the time the rotating member or disc is rotating, but the field of the pole magnet will not be increased (and likewise will not be isolated) during that portion of each cycle of rotation when the pole magnet is closest to or has the most magnetic attraction to the rotating magnet or rotor. During these time the coupling will be reduced by eliminating the DC applied to the winding but not by enough to slow down or stop the rotation. Experiment has shown that increasing the field of the stationary permanent pole magnet for even a few degrees of the total 360° of rotation while returning it to its unaltered or permanent magnet state (no current through coil) for a short time during each cycle will cause the rotating member to continue to rotate indefinitely being limited only by the bearings used to support it. It has also been discovered that by adding energy by way of the coil to cancel the effect of the pole piece for as little as 18° of the total 360° of rotation is sufficient to overcome any tendency for the rotary member to stop. Such a construction will accelerate at a fast rate and maintain a high rotational speed even in a construction having only one rotating and one stationary pole piece. Applicant has produced such a device in which the rotating member rotated at several thousand RPM and with appreciable torque.

Figure 13:
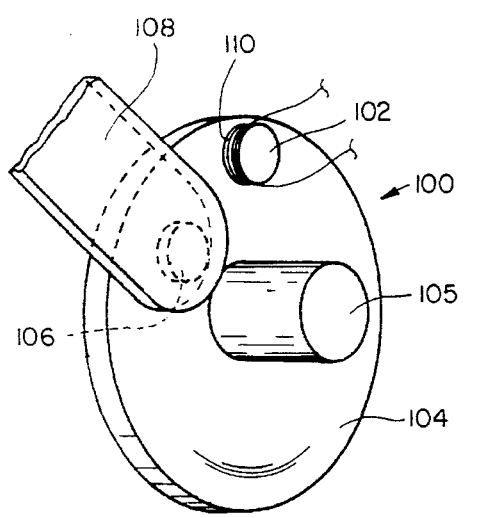
FIGS. 13 and 14 are perspective views showing other alternative embodiments of the present invention.

FIG. 13 shows a relatively simple embodiment 100 of the present device utilizing a permanent magnet control means that includes one permanent magnet pole piece 102 having no special shape but which is mounted adjacent to one side of a non-magnetic rotatable disc such as plastic disc 104. The disc 104 is mounted for rotation on a journaled shaft 105. A stationary permanent magnet pole piece 106 is mounted adjacent to one side of the disc 104 on a fixed support 108 in position to produce magnetic attraction with the rotating magnet 102 in certain positions of the disc 104. The rotating pole piece 102 has a coil 110 mounted on it as shown, and the coil 110 can be connected to a source of voltage and control circuit through commutation means (not shown). Once the disc 104 starts to rotate, and this may be done by mechanical means such as by starting it to rotate with a finger, each time the rotating pole piece 102 approaches the stationary pole piece 106 the speed of rotation of the disc 104 will speed up until the pole pieces 102 and 106 are adjacent to each other. In this position it would be expected that the disc 104 would stop. However, as the rotating magnet 102 moves to align itself with the stationary pole magnet 106, the coil 110 will be energized by applying a DC voltage thereacross which produces a field in opposition to the field of the permanent magnet 102 so as to cancel the field. The coupling force between the magnets 102 and 106 is therefore interrupted or blocked at this time and this enables the rotating disc 104 to continue to rotate past the point of closest proximity and enables the rotating magnet 102 to again reach the area where magnetic attraction between the magnets again occurs to produce the energy for the succeeding cycle of rotation.

The rotating member 104 can be a plastic or other non magnetic member or it can be a member constructed of a magnetizable material such as of soft iron. To further increase the rotational coupling force between the stationary and rotational pole pieces several stationary magnets and/or several rotational pole pieces such as the pole pieces 112–126 (FIG. 14) can be provided, the rotating pole pieces being mounted at arcuately spaced locations on the rotating disc 104. In this construction each of the stationary or rotating magnets and the coils thereon must be individually controlled as aforesaid and at the proper times in order to produce continuous rotational motion.

Figure 15:
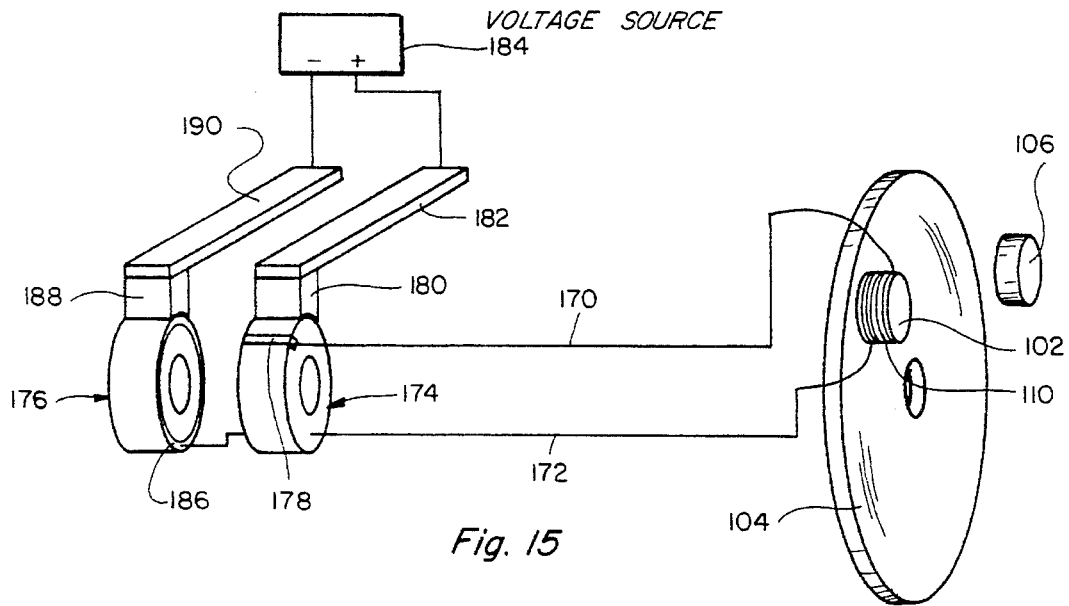
FIG. 15 is a perspective view partly in diagramatic form showing another embodiment of the subject device using commutator means to control and time the application of direct current to a coil wound around a permanent magnet on a rotating disc.
Figure 16:
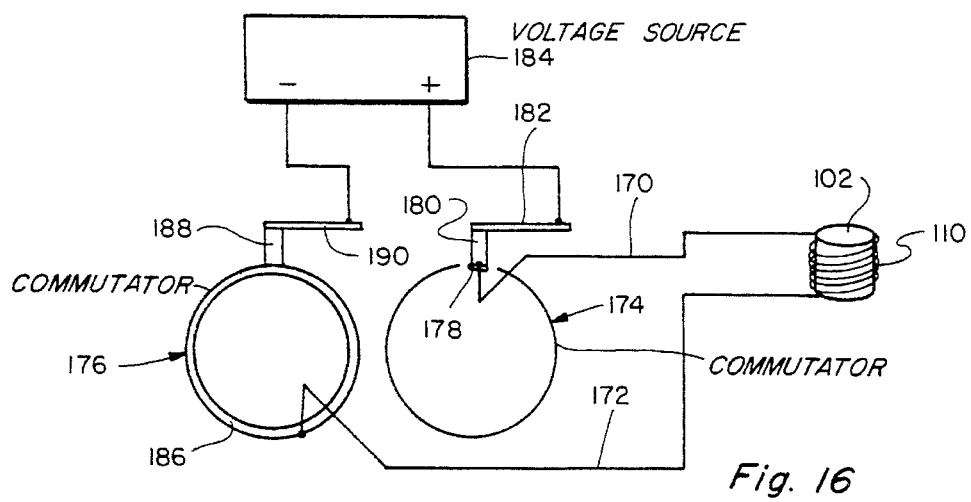
FIG. 16 is a schematic diagram of the circuit for the device shown in FIG. 15.
Figure 17:
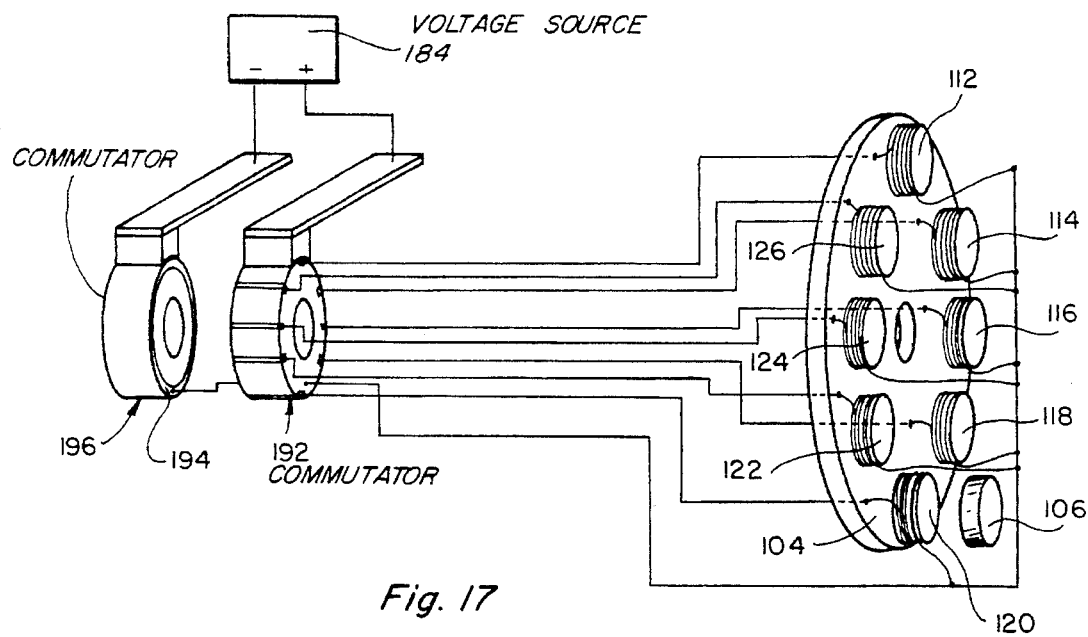
FIG. 17 is a perspective view similar to FIG. 15 but showing a rotating disc having a plurality of permanent magnets with coils wound around them and associated commutator and DC source means.
Figure 18:
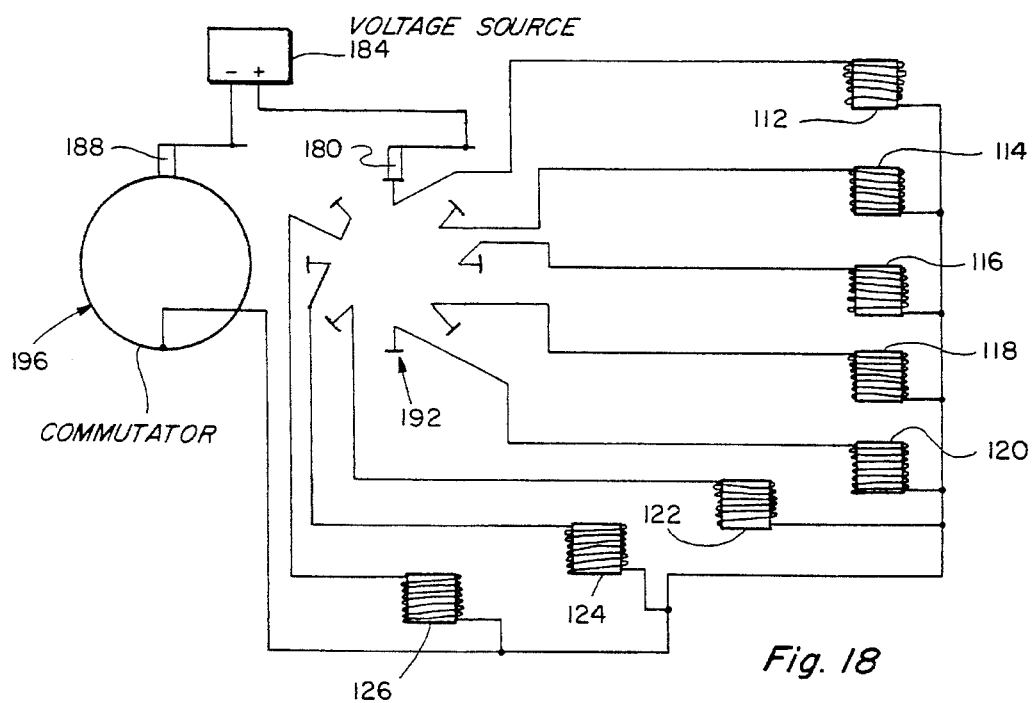
FIG. 18 is a schematic circuit diagram of the construction shown in FIG. 17.

Schematic circuit diagrams for timing the application of DC to the coil 110 on the permanent magnet 102 is shown in FIGS. 15 and 16. Similar control circuits can be provided for each magnets 112–126 when a plurality of controlled magnets are used as shown in FIGS. 17 and 18.

Figure 28:
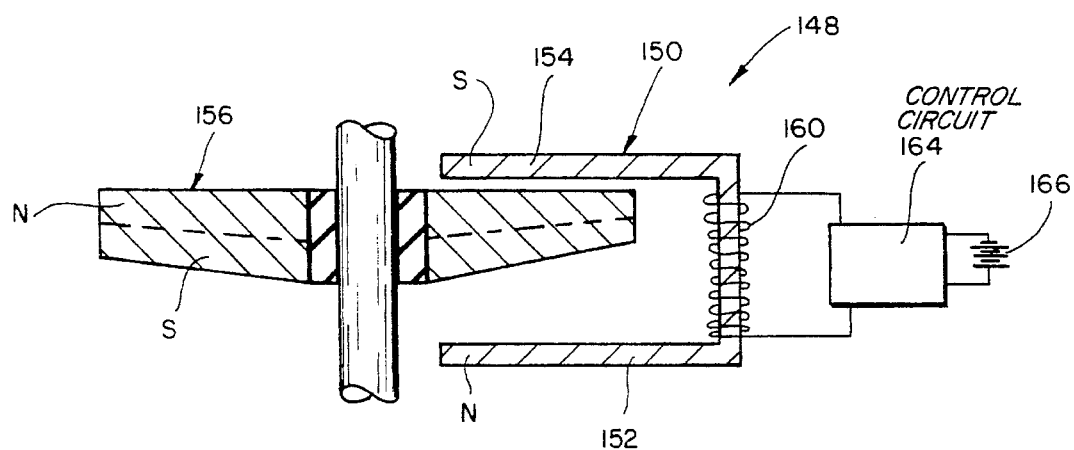
FIG. 28 is a cross-sectional view taken on line 28—28 of FIG. 27.
Figure 29:
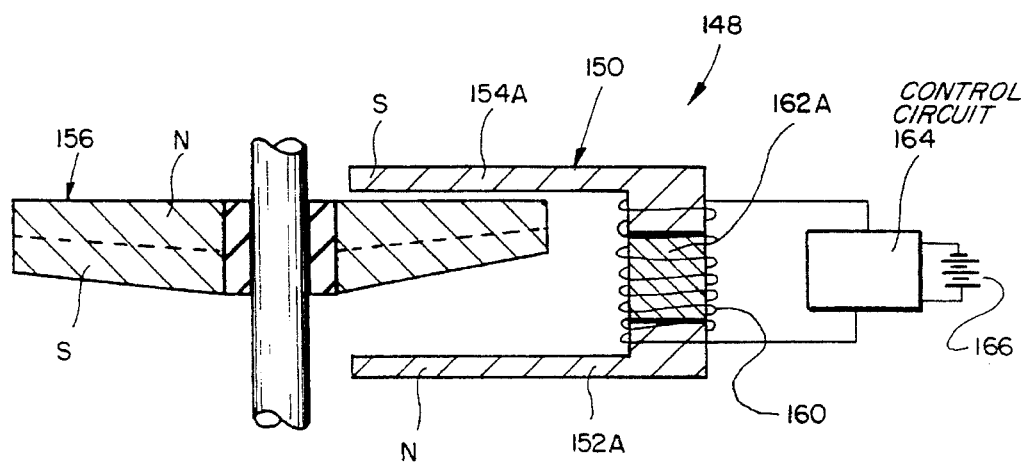
FIG. 29 is a cross-sectional view similar to FIG. 28 but showing another construction for the C-shaped member.

If a piece of a magnetizable material, such as a piece of soft iron, is placed in the magnetic field of a permanent magnet it will to some extent take on the characteristics of the permanent magnet. Also by wrapping or winding a coil of wire around the magnetizable member, the field of the material can be either strengthened, reduced in strength or cancelled by passing current through the winding as aforesaid. Consider, for example, the construction 148 shown in FIG. 27 which has a U-shaped iron pole piece 150 positioned to have its spaced leg 152 and 154 straddling a rotor or disc member 156 also formed of magnetized material. The disc 156 has a peripheral portion 158 of magnetized material that has north and south poles positioned as shown. The magnetic field of the rotor 156 will be such that a magnetic field is established in the magnetizable material or iron in the same manner as in any permanent magnet. In other words when the magnetizable material is in the magnetic field of the U-shaped permanent magnet 150 it takes on the characteristics of the permanent magnet and has its own north and south poles. In this way the rotating member 156 creates its own adjacent poles. A coil 160 is mounted on the center portion 162 of the U-shaped member 150 and is connected to a circuit 164 that controls the connection of the winding 160 to a source of DC voltage shown as battery 166. The source of energy 166 is arranged in the circuit in a direction to oppose and cancel the magnetic field in the U-shaped member 150, but the source is not strong enough to produce in the member 150 its own electro-magnetic field. When this is done the winding 160 on the U-shaped member 150 causes the member 150 to become an electro-magnet in which only enough energy flows to produce a counter magnetomotive force equal to and in opposition to the magnetic flux that is established in the member 150 by the peripheral permanent magnet portion 158 of the rotor or disc 156. By energizing the coil 160 to the point where it cancels the effect of the field of the permanent magnet 150 on the U-shaped member, the pole piece will produce a magnetic field that is equal to the amount of flux it has been cancelling. The construction 148 operates basically the same as the other embodiments such as those shown in FIGS. 13 and 14 except that in the FIG. 27 construction the winding 160 is energized instead of being deenergized at the point where greatest attraction occurs so as to eliminate the effect of the field of the magnetizable material. In this construction as in the other constructions all of the force or torque to produce the rotational movement is produced by a permanent magnet. FIGS. 28 and 29 show the same device 148, FIG. 28 showing use of a soft iron pole piece 150 while FIG. 29 shows use of two steel or like pole pieces 152A and 154A connected by permanent magnet pole piece 162A therebetween.

Figure 14:
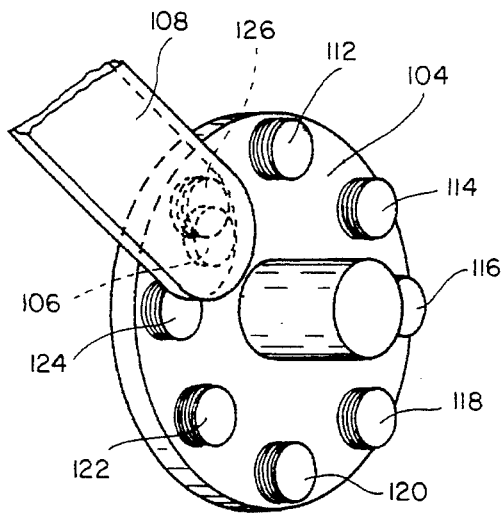

The constructions shown in FIGS. 15–26 are based on the constructions shown in FIGS. 13 and 14 and show various ways of controlling the application of voltage to the control winding or windings. In the construction shown in FIGS. 15, 17 and 19, the control is of the voltage that is applied to the coils mounted on the permanent magnet or magnets on the insulated disc member 104. In the construction shown in FIGS. 21 and 22 the control is of the winding mounted on the stationary permanent magnet 106.

Referring to FIG. 15 the magnet 102 has the coil 110 mounted on it, and the coil is connected by leads 170 and 172 to conductive portions of respective commutator members 174 and 176. The commutators 174 and 176 are mounted for rotation with the disc member 104. The commutator member 174 has a cooper segment 178 which spans a predetermined arcuate portion of the circumference corresponding to the time when DC power source should be applied to the winding 110. The commutator 174 is engaged by a brush 180 which is connected to arm 182 that has an electrical connection to the positive side of voltage source 184. The lead 172 extends through a hole in the commutator 174 and is connected to an annular conductive ring 186 that extends around the periphery of the commutator 176. The ring 186 makes electrical contact at all times with a brush 188 connected by arm 190 to the negative terminal of the DC voltage source 184. When the disc 104 and the commutators 174 and 176 are rotating, DC voltage will be applied to the coil 110 for short periods of time which occur when the magnet 106 is in close proximity to the magnet 102. This is done to prevent magnetic coupling therebetween. This is also the time when the magnetic coupling otherwise would be maximum and therefore would cause the disc 104 to stop. By magnetically isolating the magnets 102 and 106 from each other at this time, the disc 104 will continue to rotate without stopping. FIG. 16 shows the equivalent electrical circuit for the construction shown in FIG. 15.

FIG. 17 shows a construction similar to that shown in FIG. 14 including having a rotatable disc member 104 with a plurality of magnetic members such as the magnetic members 112–126 mounted thereon. The stationary permanent magnet in this construction is similar to the magnet 106 and is mounted adjacent to the disc 104 to move in close proximity with the magnets 112–126, one at a time. In the construction shown in FIG. 17 each of the permanent magnets 112–126 has its own coil and the coils are connected to respective conductive segment strips on commutator 192 positioned or timed to correspond to the positions when each of the respective magnets 112–126 moves adjacent to the fixed magnet 106. The opposite side of each of the coils on the magnets 112–126 are connected in common and to the annular conductive layer 194 on the other commutator 196. The construction shown in FIG. 17 operates similarly to the construction shown in FIGS. 13 and 16 except that each of the rotatable magnets is individually controlled by having a DC potential applied across it at the time that it is moving adjacent to the stationary coil 106. Such a construction provides more continuous magnetic coupling between the stationary magnet and the magnets on the rotatable structure and will therefore provide additional energy for rotating the disc 104 and anything connected thereto.

FIG. 18 is a schematic circuit diagram for the construction shown in FIG. 17, and the parts shown therein are similarly identified.

Figure 19:
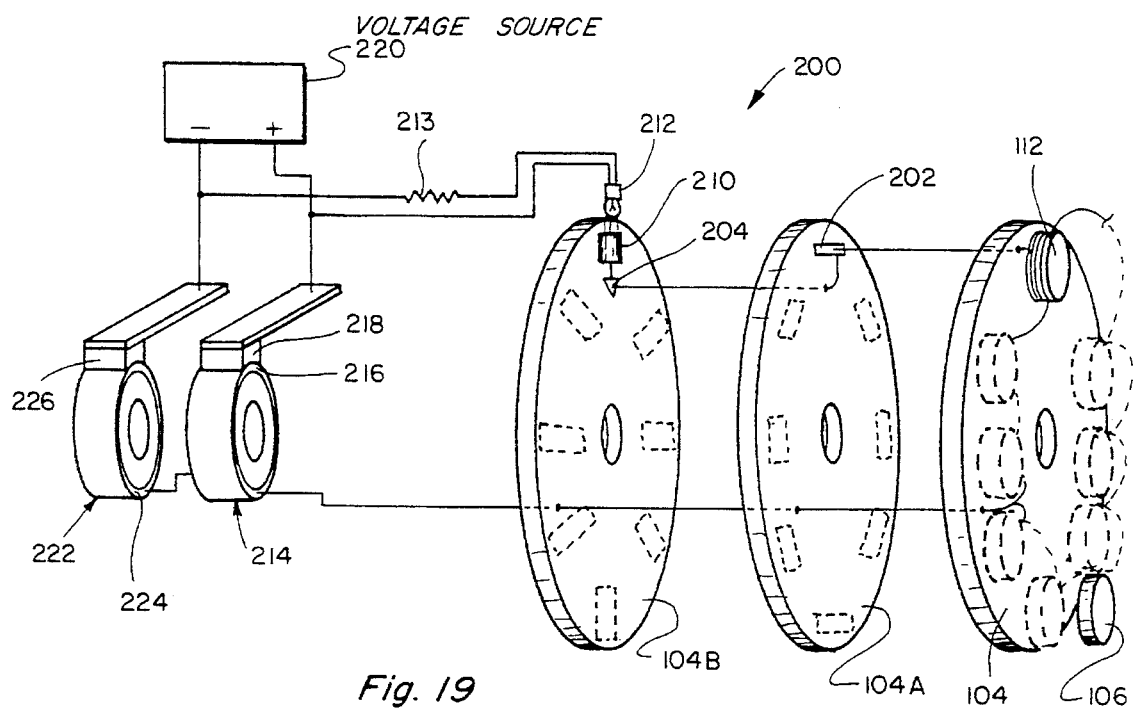
FIG. 19 is a perspective view similar to FIGS. 15 and 17 but showing the use of electronic-optical timing means.
Figure 20:
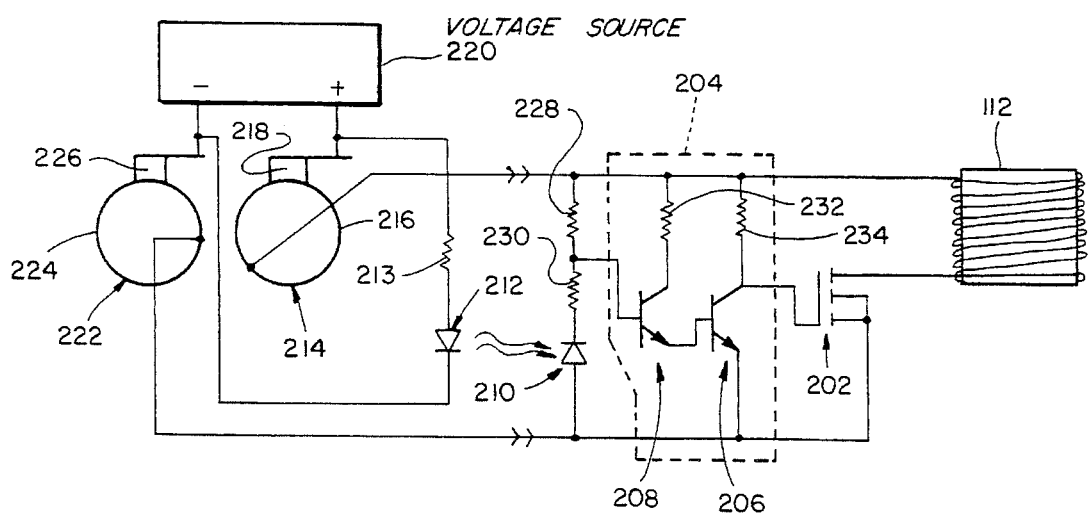
FIG. 20 is a schematic diagram of the control circuit for one of the coils mounted on the rotatable disc in the construction shown in FIG. 19.

FIG. 19 shows another embodiment 200 of a construction similar to that shown in FIG. 14 except that the rotating disc structure 104 has more circuitry including optical means on it to control the application of DC voltage to the respective rotating coils. FIG. 20 shows the details of the circuitry associated with one of the rotating coils, the others having similar circuitry.

Referring to FIG. 19 and 20 in detail, and using numbers similar to the numbers used above where applicable, the device 200 includes a rotating disc member 104 which has connected rotating portions 104A and 104B. The rotating permanent magnets 112–126 are mounted on the disc 104 in the matter already described and rotate adjacent to a fixed permanent magnet 106. The magnets 112–126 have coils mounted on them and the coils are connected into circuitry which controls them in the manner illustrated above. The controls for the coils on the magnets 112–126 are connected through respective power MOSFET transistor switches 202 which in turn are connected to amplifier circuits 204 which include transistors members 206 and 208 connected as shown in FIG. 20. The input to the transistor 208 is connected through a circuit which includes resistor elements and a phototransistor 210. A similar phototransistor and associated amplifier circuits is provided for each of the coils. The phototransistor 210 is mounted on the rotatable member 104B and is exposed during a portion of each cycle of rotation of the rotatable structure 104, 104A and 104B to the light from a stationary light source 212. The light source 212 is connected in series with a resistor 213 across a voltage source. The circuit of the phototransistor 210 and the associated amplifier circuit 204 and element 202 are connected to commutator means including a first commutator 214 having a conductive peripheral portion 216 which makes sliding engagement at all times with a brush member 218 that is connected to the positive side of voltage source 220. A second similar commutator structure including commutator member 222 having a conductive peripheral portion 224 slidably engages another brush 226 connected to the other side of the circuit that includes the phototransistor 210 and the amplifier circuit 204. The brush 226 is connected the negative terminal of the voltage source 220.

The amplifier circuit 204 is formed by the transistors 206 and 208 and forms a darlington amplifier pair which switches on and off the current flowing through the magnet control coil on the respective permanent magnet 112–126. Timing is accomplished by the number of degrees of rotation of the phototransistors such as phototransistor 210 in the field of the light given off by the light source 212. The circuit for each of the permanent magnets 212–126 are similar and each of the phototransistors such as phototransistor 210 is reverse biased and its output is fed to the base of the transistor 208 of the Darlington amplifier. The sensitivity or switching point of the transistor 208 is determined by the proportional values of the biasing resistors 228 and 230 and the resistor 232 determines the gain of the transistor 208. The transistor 206 is an emitter follower whose gain is controlled and determined by another resistor 234. The transistors 206 and 208 may be of the NPN general purpose type.

The light source 212 for each of the circuits may be a light emitting diode (LED) whose radiation would be in the infrared region of the electro-magnetic spectrum. The resistor 213 provides current limiting control for the light source 212.

The number of turns and the gage of the wire wound on the rotating magnets 112–126 is determined by the size and strength of the permanent magnet to be controlled and by the strength of the voltage source. A typical magnet assembly using ⅜ inch diameter, ¼ thick button magnets would have a coil consisting of about 152 turns of 28 copper wire and use a 12 volt power supply.

The direction of winding of the turns and the polarity of the coils in relation to the permanent magnet on which they are mounted is illustrated in FIGS. 25–26. The direction of the windings and the polarities thereof are such as to oppose the permeability of the air surrounding the permanent magnet so as to decrease the permeability by an amount determined by the ampere turns of the respective coil. FIGS. 23 and 24 show the direction of the turns and the polarity of the coils wound in the manner to produce an aiding permeability condition with respect to the permeability of the permanent magnet, and therefor, if used, would increase the strength of the permanent magnet by the amount of ampere turns of the respective coil. Such an embodiment could be used to impart energy to a rotational member by increasing the coupling between the stationary permanent magnet and the magnet on the rotating structure, preferrably as the rotating magnet approaches the stationary magnet, and just at the angular position where lock up would occur due to the maximum coupling therebetween, whereupon the coupling between stationary permanent magnet and the rotating magnet would be returned to normal. In this case enough energy would be imparted to the rotating member to continue to carry the magnet of the rotating member past the stationary magnet. It is thus apparent that both increasing the magnetic coupling and decreasing the magnetic coupling at the proper time and by the proper amount can be incorporated within the same embodiment, and it is also possible, rather than returning the coupling force to normal by removing the voltage across the winding the field of the coil it could be reversed to cancel or substantially reduce the coupling altogether.

FIGS. 21 and 22 show an embodiment that is similar to that described above except that the stationary magnetic member rather than the rotatable permanent magnets has a control winding 500 mounted thereon. Such as embodiment is preferred over some of the other embodiments because only one permanent magnet, namely the stationary magnets needs to have a control winding mounted on it. The circuit for the embodiments shown in FIGS. 21 and 22 may be similar to the circuit shown in connection with the construction of FIGS. 19 and 20. However, in the construction shown FIGS. 21 the light emitting diode 502 projects onto a reflective surface 504 on the edge of the rotating disc 506 and is reflected back onto a phototransistor or a phototransducer 508 and the signal produced is amplified. The circuit of FIG. 22 is not substantially different in construction and operation from the circuit shown in FIG. 20. However, an advantage of the construction shown in FIGS. 21 and 22 is that because of the manner in which the light from the light source is directed to the reflective surfaces on the rotating member 506 and then back to the phototransistor 508, it is not necessary to have a commutator such as are included in the other constructions. In this regard note that the MOSFET 510 is controlled in such a manner as to control application of dc power across the winding 500 on the magnet 106. Since the coil 500 is on the stationary permanent magnet 106, no commutators are necessary as in the other constructions. The timing of the energizing of the coil 500 under control of the MOSFET 510 is determined by the angular length of the reflective segment 504 plus the field of view of the phototransistor 508 and the beam divergence of the light emitted by the light source 502.

Figure 30:
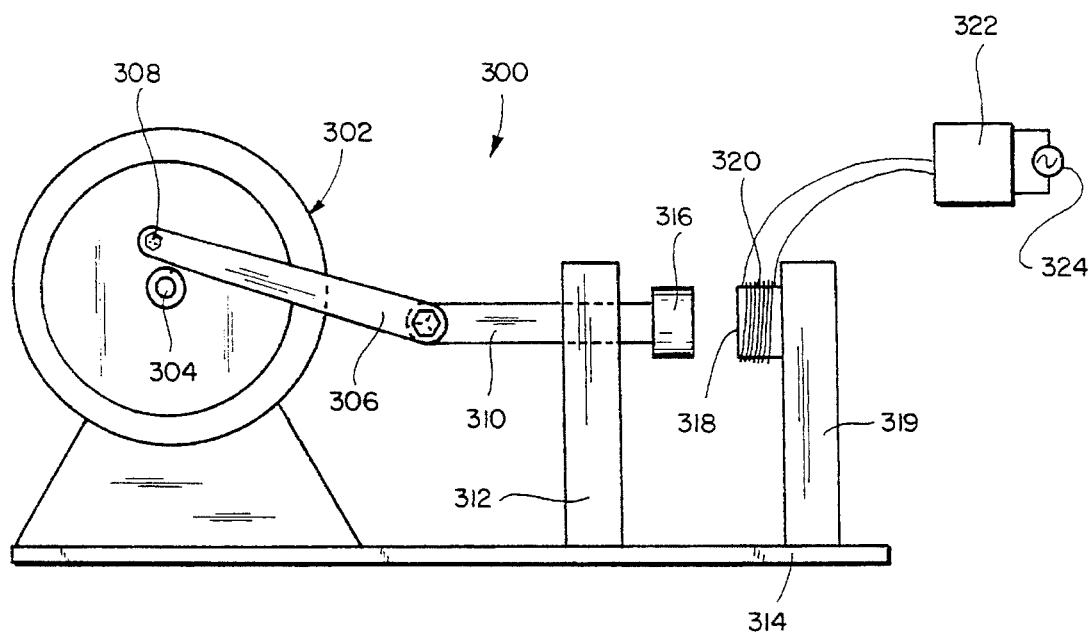
FIG. 30 is a side elevational view of another embodiment of the invention specifically constructed to produce reciprocating motion.

FIG. 30 shows another embodiment 300 of the present device designed to produce reciprocating rather than rotational motion. The device includes a rotating member or flywheel 302 rotatably mounted on a shaft 304, the flywheel 302 being pivotally connected by a crank arm 306 to one end of a reciprocating rod 310 mounted for reciprocating movement in a support member 312. The support member 312 is attached to a base member 314 as shown. The opposite or free end of the rod 310 has a magnetic member 316 mounted on it, and the member 316 is positioned in spaced relationship to a second fixed permanent magnet member 318 attached to support member 319. The magnet 318 has a winding 320 mounted thereon. The winding 320 is connected to a control circuit 322 which in turn is connected to a source of power such as AC source 324. The control circuit may include timer means and rectifier means along the lines already disclosed in connection with the other embodiments. The circuit 322 operates to cancel and isolate the field of the magnet 318 from the magnet 316 as the inertia of the flywheel moves the member 310 and the magnet 316 to its closest position to the magnet 318. During the rest of the cycle the opposite condition occurs and the coil 320 is deenergized. Once the rotating member 302 is placed in motion, the rod 310 will move back and forth being urged in one or the other direction by the magnetic coupling or repelling force between the magnets 316 and 318. The winding 320 can be timed to produce a field around the magnet 318 which will either enhance the magnetism thereof and therefore increase the magnetic attraction between the magnets 316 and 318 or to reduce and/or isolate the magnetism of the magnet 318 so that no magnetic coupling will be produced between the magnets 316 and 318 during a portion of each cycle of operation. By properly timing the voltage applied to the winding 320, the rotation of the rotating member 302 and the reciprocating motion of the rod 310 can be sustained.

Figure 31:
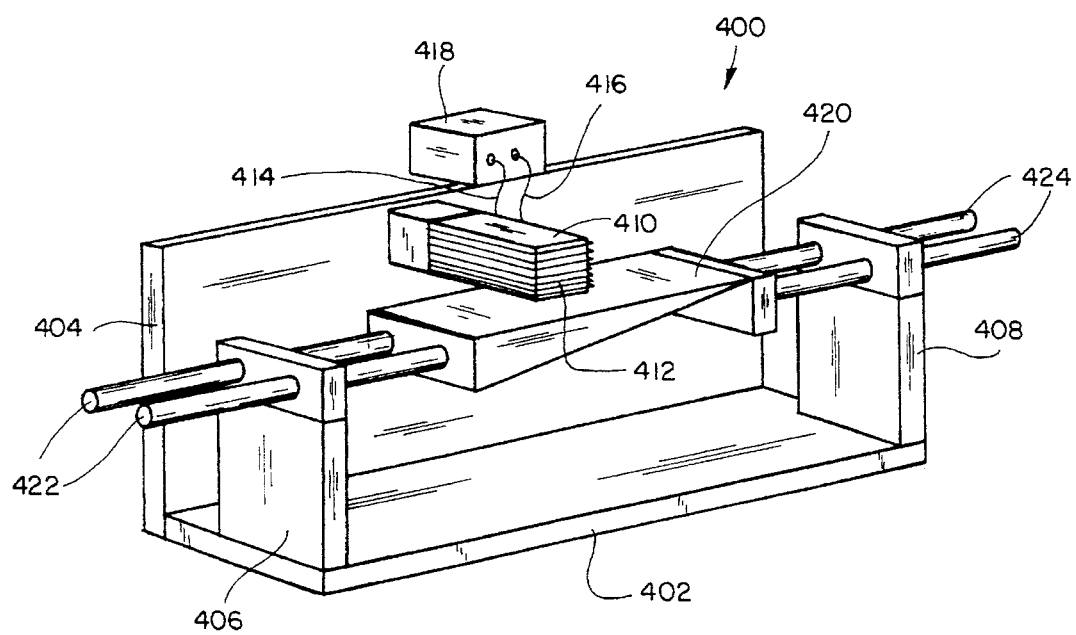
FIG. 31 is a perspective view showing yet another embodiment specificially for producing linear motion.

FIG. 31 shows another embodiment 400 which uses the teaching of the present invention to produce linear as distinguished from reciprocal or rotational motion. The construction shown in FIG. 31 includes a support stand having a lower wall 402, a back wall 404, and two spaced upstanding end walls 406 and 408. A stationary permanent magnet 410 is attached extending outwardly from the rear wall 404, and the magnet 410 has a winding 412 mounted on it as shown. The winding 412 is connected by leads 414 and 416 to a control circuit 418 and associated power source which may be similar to the control circuits and power sources shown in the other drawings. The permanent magnet 410 is positioned above elongated permanent magnet 420 which is shown being tapered from end to end so that its magnetic strength also varies from end.

It is possible to incorporate a return spring feature in the constructions shown in FIGS. 30 and 31. If a spring is incorporated, the spring can be arranged to act in opposition both on attract or on repel, or one can be provided to operate on attract and one on repel so long as they are pulling in opposite directions. Furthermore, by applying direct current to the coil in an amount that does not completely cancel the field of the permanent magnet, it is possible to change the position of the movable member. The position of the moveable member can also be varied by varying the current. Such devices can be used with disk drives, robotic devices, and in other places where it is desired to control the position of the movable member for some purpose.

The member 420 is shown connected at its opposite ends to rods 422 and 424 which are slidably mounted in openings in the end wall members or bearing blocks 406 and 408. This construction as in the others can use increasing magnetic coupling or increasing magnetic repulsion to produce the desired linear sliding movement of the rods 422 and 424 and of the attached member 420. In this construction as in the others the member 420 has a north pole on one side (top or bottom as shown) and a south pole on the opposite side. Therefore it has been shown that the teachings of the present invention can be used to produce rotational, reciprocating, oscillating as well as linear motion.

Thus there has been shown and described several different embodiments of a device capable of producing motion generated by permanent magnets and in some cases permanent magnets with control windings wound around or mounted on them. It will be apparent to those skilled in the art, however, that many changes, modifications, variations and other uses and applications of the present invention are possible and contemplated and all such changes, modifications, alterations and other uses and applications which do not depart from the spirit and scope of the invention are deemed to be covered by the invention which is limited only by the claims which follow.

What is claimed is:

1. A device to control the magnetic properties of a permanent magnet including the ability of the permanent magnet to magnetically interact with another permanent magnet comprising:

first and second permanent magnets having north and south poles, a coil of conductive metal wound about the first permanent magnet intermediate the north and south poles, the first permanent magnet having north and south poles lying in a first plane, the second permanent magnet having north and south poles lying in a second plane that is substantially parallel to the first plane, means to control the linear movement of the second permanent magnet in a plane perpendicular to the first and second planes caused by the magnetic interaction between the first permanent magnet and the second permanent magnet including a source of direct current energy and switch means connected in series therewith across the coil whereby when the switch means are closed the direct current source is applied across the coil whereby the magnetic flux of the first permanent magnet changes the ability of the first permanent magnet to interact with the second permanent magnet.

2. A device to produce reciprocating motion comprising a rotatable member of flywheel construction having an arm pivotally connected thereto at a location spaced radially from the axis of rotation, said arm having an opposite end pivotally connected to a second arm mounted for reciprocating motion, said second arm having a free end with a first permanent magnet mounted thereon, one of the poles of the first permanent magnet forming the end surface of the reciprocating member, a fixed support member positioned in close promixity to said first permanent magnet, a second permanent magnet mounted on said fixed support member in alignment with the first permanent magnet whereby the first permanent magnet moves toward and away from the second permanent magnet when the flywheel is rotated, a winding mounted on one of said first and second permanent magnets, and circuit means connected to said winding to control the magnetic characteristics thereof, said circuit being timed to energize the winding in such a way as to change the magnetic interaction between the first and second permanent magnets and to apply force on the first permanent magnet in a direction to maintain rotation of the flywheel.

3. A device to produce linear motion of a first member relative to a second member, the first member being a permanent magnet having a north pole on one side and a south pole on the opposite side, said first member being constructed so that the magnetic characteristics thereof vary from end to end, means for supporting the first member for linear movement in a direction normal to the direction through the magnet poles thereof, a second member having magnetic characteristics mounted adjacent one side of said first member, a winding mounted on the second member, and means to control the application of electric energy to said winding to modify the magnetic flux emanating from the second magnet member and the coupling between the first and second members.

4. A device to modify the magnetic flux emanating from a first permanent magnet including the ability of the first permanent magnet to magnetically interact with a second permanent magnet comprising:

a first permanent magnet having opposed north and south poles lying in a first plane, a winding of electrically conductive material mounted on the first permanent magnet, a second permanent magnet having north and south poles lying in a second plane that is substantially parallel to the first plane and positioned to magnetically interact with the first permanent magnet, and means to control the linear movement of the second permanent magnet in a plane perpendicular to the first and second planes caused by the magnetic interaction between the first and second permanent magnets, said means including an electric energy source and switch means connected across the winding of electrically conductive material whereby closing of the switch means establishes a voltage across the winding of electrically conductive material that modifies the magnetic characteristics of the first permanent magnet by changing the flux emanating therefrom and the ability of the first permanent magnet to interact with the second permanent magnet.

5. The device of claim 4 wherein the electrically conductive winding is mounted on the first permanent magnet between the north and south poles thereof.

6. The device of claim 4 wherein the energy source is a DC energy source polarized relative to the winding of conductive material to increase the magnetic force of the permanent magnet when the energy source is connected across the winding.

7. The device of claim 4 wherein the polarity of the energy source is oriented to reduce the magnetic force of the first permanent magnet when the energy source is connected across the winding of conductive material.

8. The device of claim 4 wherein the means to modify the flux emanating from the first permanent magnet reduces the magnetic interaction between the first permanent magnet and the second permanent magnet when the energy source is connected across the winding of conductive material.

9. The device of claim 4 wherein the switch means include optical switch means.

10. The device of claim 4 wherein the switch means include reed switch means.

11. A device to control the magnetic properties of a permanent magnet including the ability of the permanent magnet to magnetically interact with another member having magnetic characteristics comprising:

a permanent magnet having north and south poles, a coil of conductive metal wound about the permanent magnet intermediate the north and south poles, a member having magnetic characteristics mounted on a rotatable member having an axis of rotation, the member having magnetic characteristics including a circumferentially extending portion of the rotatable member, means mounting the permanent magnet adjacent to the circumferentially extending portion of the rotatable member whereby the permanent magnet is magnetically coupled thereto, the circumferentially extending portion of the rotatable member having portions of greater magnetic characteristics than others, and a source of direct current energy and switch means connected in series across the coil whereby when the switch means are closed the direct current source is applied across the coil whereby the magnetic permeability of the permanent magnet changes the ability of the permanent magnet to interact with the member having magnetic characteristics, the circumferentially extending portion of the rotatable member having a circumferentially extending helical shaped portion.

12. The device of claim 11 wherein the helical shaped portion extends circumferentially around the peripheral edge portion of the rotatable member going from a point of maximum diameter to a point of minimum diameter adjacent to the same circumferential location.

13. The device of claim 11 wherein the circumferentially extending portion of the rotatable member varies in thickness circumferentially around the rotatable member, the thickest and thinnest portions thereof being adjacent to one another.

14. The device of claim 13 wherein one side surface of the rotatable member is relatively flat, and means mounting the permanent magnet adjacent to said flat side surface.

* * * * *